June 19, 1945. E. S. RENSCH 2,378,658
GRAIN LOADER
Filed July 20, 1943 2 Sheets-Sheet 1
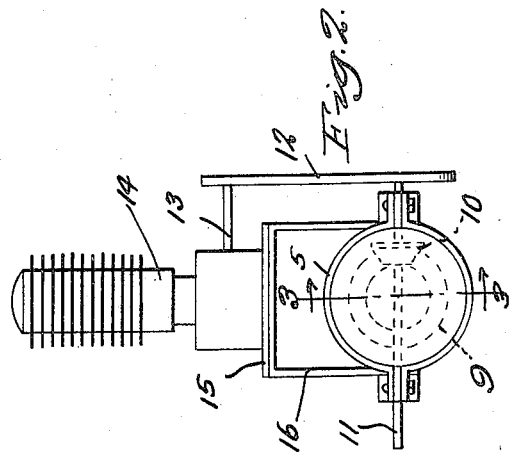
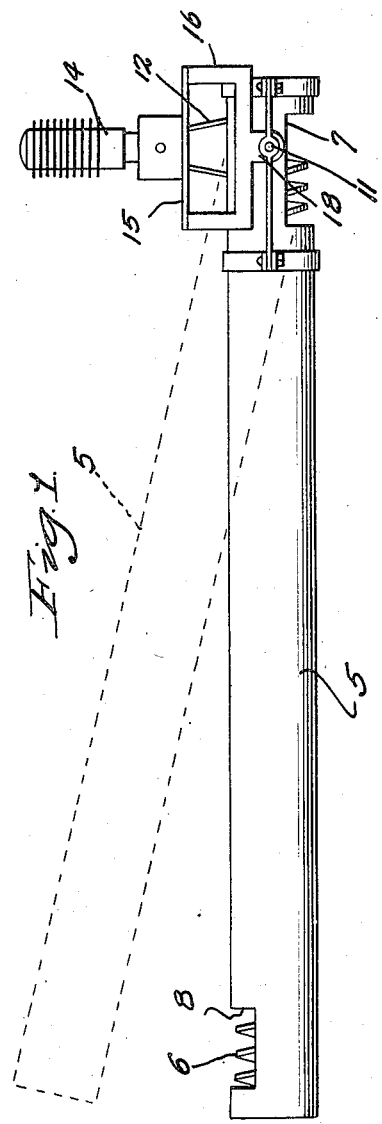
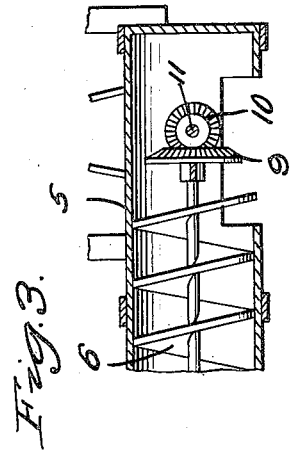
Inventor
Emmanuel S. Rensch
By Clarence A. O'Brien
and Harvey B. Jacobson
Attorney

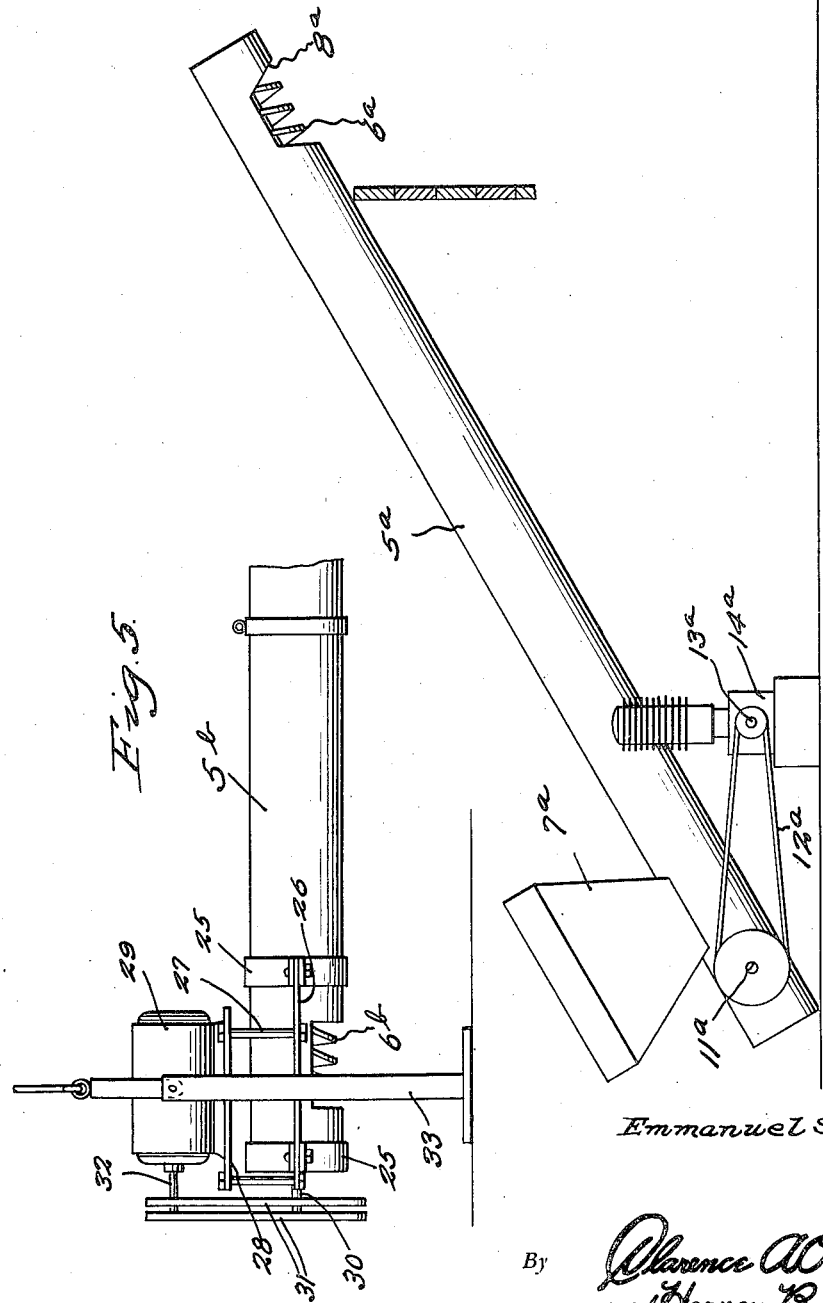

Patented June 19, 1945

2,378,658

UNITED STATES PATENT OFFICE 2,378,658

GRAIN LOADER

Emmanuel S. Rensch, Ramona, S. Dak.

Application July 20, 1943, Serial No. 495,512

2 Claims. (Cl. 198—122)

This invention appertains to new and useful improvements in grain loaders or conveyors, the principal object being to provide a simple and readily portable unit for the efficient loading and unloading of grain from cars, wagons and other vehicles.

The principal object of the present invention is to provide a grain loader which has a wide range of adjustability to meet various awkward conditions that are met in the every day handling of grain loads.

Other objects and advantages of the invention will become apparent to the reader of the following description.

In the drawings:

Figure 1 represents a side elevational view of one form of the invention.

Figure 2 is an end elevational view of the structure shown in Figure 1.

Figure 3 is a fragmentary longitudinal sectional view taken on the line 3—3 of Figure 2.

Figure 4 is a side elevational view of a slightly modified form of the invention.

Figure 5 is a fragmentary side elevational view of a third form of the invention.

Referring to the drawings wherein like numerals designate like parts, it can be seen in Figure 1, that numeral 5 denotes an elongated tube having a screw 6 longitudinally disposed therein, this tube having an inlet 7 at one end and an outlet 8 at its opposite end. Suitable bearings are provided for the screw 6 and the inner end of the screw 6 has a bevel gear 9 which meshes with a bevel gear 10 on a transverse shaft 11 which extends transversely through the tube 5 and is equipped with a pulley at one end over which a belt 12 is trained, this belt 12, in turn, passing over a pulley on a drive shaft 13 which forms part of a power plant 14.

The power plant 14 is mounted on a platform 15 which is supported by a cradle 16 supported by the shaft 11, the cradle 16 being provided with ears 18 formed with openings through which the shaft 11 is disposed. Any suitable means may be provided to maintain the cradle 16 and platform 15 horizontal, such as a suitable prop arranged between the cradle and the tube 5.

It can now be seen, that with the power plant 14 in operation, the tube 5 and the screw shaft 6 therein can be swung in the manner suggested by broken lines in Figure 1.

A modified form of the invention is shown in Figure 4 wherein a tube 5a has an inlet hopper 7a at one end and an outlet 8a at its opposite end, the tube 5a containing a conveyor screw 6a.

In this form of the invention, a power plant 14a may be set apart from the inner or lower end of the tube 5a and the same has a drive shaft 13a driving a pulley over which a belt 12a is trained, this belt, in turn, passing over a pulley on a shaft 11a which is transversely disposed through the adjacent end of the tube 5a and which, of course, is in driving connection with the screw 6a. Obviously, this arrangement permits various positionings of the tube 5a for accurate loading or unloading of grain and other materials.

A third form of the invention is shown in Figure 5 wherein a tube 5b contains a conveyor screw 6b and in this form of the invention clamp rings 25 are provided on the butt end of the tube 5b for the purpose of supporting elongated plates 26, these in turn supporting risers 27 which, in turn, support a platform 28 on which an electric motor 29 is secured. The screw 6b has a shaft extension 30 extending through the butt end of the tube 5b and this has a pulley or pulleys over which a belt or belts 31 are trained, these, in turn, being disposed over corresponding pulleys on the armature shaft 32 of the motor 29. A suitable stand 33 is provided for this end of the tube 5b.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A readily portable grain loading or unloading conveyor unit comprising an elongated tube closed at the ends thereof and having oppositely facing inlet and outlet openings in the body thereof near opposite ends of the same, a conveyor screw in the tube, a transverse shaft journaled in one end of the tube and geared to one end of the conveyor screw within said tube, a motor supported by said transverse shaft above said one end of the tube, and a belt gearing between said motor and said transverse shaft permitting said tube and conveyor screw to move to different angular positions relative to the motor.

2. A grain loading or unloading conveyor comprising a tube closed at the ends thereof and having oppositely facing inlet and outlet openings in the body thereof near opposite ends of the same, a cradle disposed over and pivoted to one end of the tube, a motor mounted on the cradle, a drive shaft passing transversely through the tube and operatively geared to one end of the screw, said shaft constituting the pivot of said cradle, and a belt gearing between the motor and said transverse shaft permitting pivotal movement of the tube and conveyor screw relative to the motor.

EMMANUEL S. RENSCH.